(No Model.) 2 Sheets—Sheet 2.
F. R. PACKHAM.
SEEDING MACHINE.
No. 527,621. Patented Oct. 16, 1894.
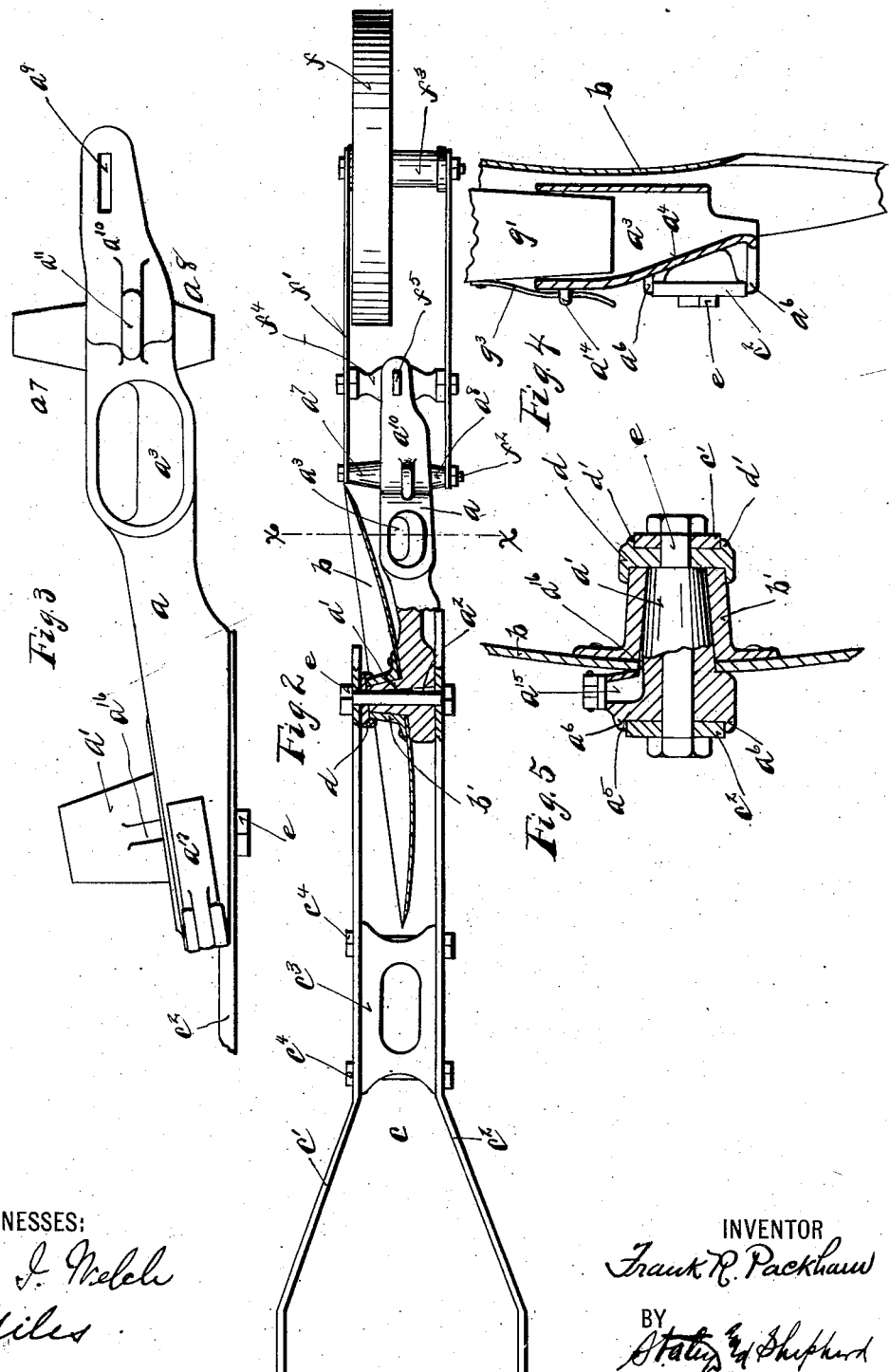
WITNESSES:
Chas. J. Welch
JS Miles
INVENTOR
Frank R. Packham
BY
Staley & Shepherd
ATTORNEYS

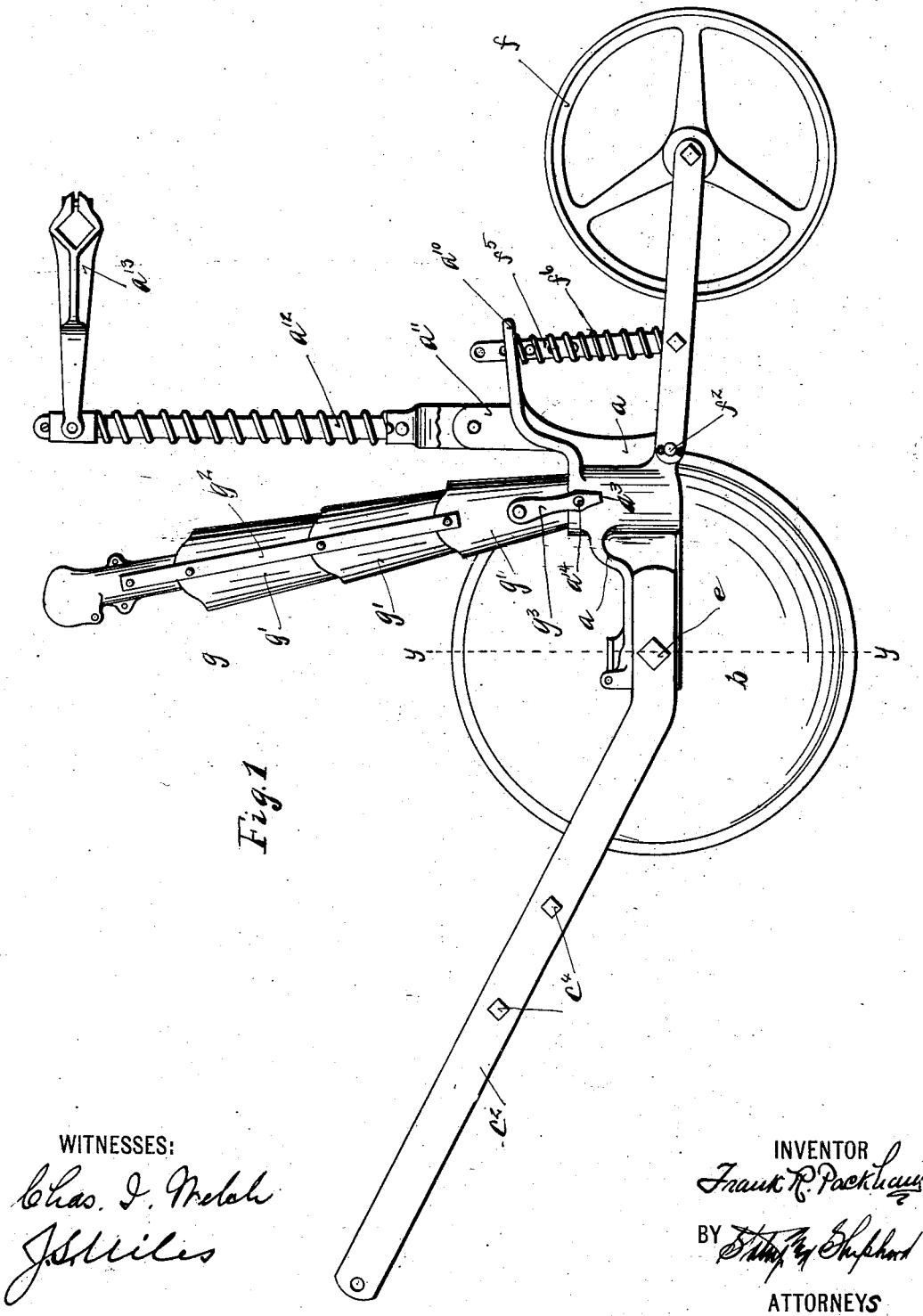

UNITED STATES PATENT OFFICE.

FRANK R. PACKHAM, OF SPRINGFIELD, OHIO, ASSIGNOR TO THE SUPERIOR DRILL COMPANY, OF SAME PLACE.

SEEDING-MACHINE.

SPECIFICATION forming part of Letters Patent No. 527,621, dated October 16, 1894.

Application filed July 28, 1894. Serial No. 518,846. (No model.)

*To all whom it may concern:*

Be it known that I, FRANK R. PACKHAM, a citizen of the United States, residing at Springfield, in the county of Clark and State of Ohio, have invented certain new and useful Improvements in Seeding-Machines, of which the following is a specification.

My invention relates to improvements in seeding machines and it especially relates to devices for opening a furrow and planting the grain therein, together with mechanism for adjusting and supporting the same.

The object of my invention is to provide a furrow opener for seeding devices which shall consist essentially of a single concave disk journaled on a suitable support; the construction being such that any number of such single-disked furrow openers may be employed in a seeding machine, each disk being absolutely independent of the other disks.

A further object of my invention is to provide a novel and efficient support for the furrow opener and the devices for conveying the grain thereto.

A further object of my invention is to provide a novel arrangement of the supporting and covering devices in connection with the furrow opener. I attain these objects by the constructions shown in the accompanying drawings, in which—

Figure 1 is a side elevation of a device embodying my invention, and particularly adapted for grain drills and similar seeding devices. Fig. 2 is a plan view partly in section of the same. Fig. 3 is a plan view with the furrow opener support removed. Fig. 4 is a sectional view taken on the line $x$ $x$ in Fig. 2, and Fig. 5 is a partial sectional view taken on the line $y$ $y$ in Fig. 1.

Like parts are represented by similar letters of reference in the several views.

In the said drawings, $a$ is the supporting piece or frame on which all the operating parts are supported and to which all the connections for adjustment, &c., are made. This supporting piece $a$ is cast integrally with an angularly-arranged trunnion $a'$, which is cored for an opening $a^2$, which extends entirely through the trunnion and through the end of the supporting piece $a$. On this trunnion is journaled a concave disk $b$, with the convex side next to the support; the angularity of the disk being such that as the support is drawn forward the concave side of the disk is presented in the nature of a mold board to scoop out a furrow, the earth being removed therefrom in a direction away from said support.

In the rear of the trunnion $a'$ there is cast or otherwise formed in the support $a$, an angularly-arranged opening or conduit $a^3$, which stands in proximity to the back of the disk $b$; the said conduit or one side thereof being formed at an angle in the nature of a chute $a^4$, having an angularity approximating the angularity of the side of the disk so as to direct the grain which is delivered into said conduit directly into the furrow formed by said disk and in the rear of the center thereof. The furrow opener thus formed is connected to a drag bar $c$, consisting essentially of two flat bars $c'$ $c^2$, secured rigidly together through the medium of a spacing block $c^3$ and bolts or other suitable fastening devices $c^4$; this spacing block $c^3$ being placed centrally in the length of said bars so as to leave the free ends projecting in opposite directions. The rear ends of the bars are connected to the furrow opener, a seat $a^5$ being formed at one side of the support $a'$ to receive one of the bars, $c^2$; laterally projecting flanges $a^6$ being formed on said support to embrace the said bar and hold said bar against lateral movement in said seat. The other bar, $c'$, is adapted to fit between similar flanges $d'$ $d'$ on a wedge-shaped cap or cover $d$, which fits over the end of the trunnion $a'$ and the hub $b'$ of the disk $b$; the trunnion $a'$ being slightly longer than the hub $b'$ to prevent clamping the disk when the parts are secured together. The bars $c'$ $c^2$ of the drag bar $c$ are perforated, and a single bolt $e$, which extends through said bars, through the support $a$, trunnion $a'$ and cap $d$, secures the whole firmly and rigidly together. The other or free ends of the bars $c'$ $c^2$ of the drag bar $c$ are bent outwardly to fit suitable braces and are pivotally connected to the frame of the seeding machine in the usual manner.

In the rear of the conduit $a^3$ there is formed integrally with the support projecting hubs or trunnions $a^7$ $a^8$ having a central opening extending through the same and adapted to form a connection for any suitable covering device. The hubs or trunnions $a^7$ $a^8$ are made of unequal length so that the covering device hinged thereto is brought substantially behind the disks, which is journaled at one side of the support.

I have illustrated a wheel covering device, which consists of a covering wheel $f$, journaled in a suitable hanger $f'$, which is pivoted to the trunnions $a^7$ $a^8$ by a pin or bolt $f^2$. This wheel $f$ is provided at one side with an elongated hub $f^3$ to cause the said wheel to operate on one side of the hanger and thus come directly over the furrow produced by the bottom of the furrow opening disk.

The hanger $f'$ is provided with a central spacing block $f^4$, to which is attached an upwardly-projecting link $f^5$, adapted to extend through a slotted opening $a^9$ in a backwardly-extending arm $a^{10}$, formed integral with the support $a$. This arm $a^{10}$ is also provided with an upwardly-projecting lug $a^{11}$, to which is pivotally connected a stirrup or suitable connection $a^{12}$, connected to the lifting and pressing mechanism $a^{13}$ of the seeding machine, by means of which the furrow opener may be raised or depressed as desired.

A spring $f^6$ is preferably placed on the link $f^5$, and means may be provided in the usual way for varying the tension thereof to place more or less pressure on the covering wheel $f$.

Connected with the conduit $a^3$ is a telescoping tube $g$, formed in sections $g'$ connected together in the usual way by flexible straps $g^2$ in such a manner that the parts may telescope as the furrow opener is elevated. The lower section $g'$ is provided with a spring catch $g^3$, perforated at its outer end and adapted to slip over a projecting stud $a^{14}$ on the side of the conduit $a^3$ and thus firmly unite said section to said conduit; the connection being in its nature pivotal so that the conducting tube is free to adapt itself to the varying positions of the furrow opener in raising and lowering.

By having the support having an integral angularly-arranged trunnion, and the angularly-arranged conduit in the rear of the furrow opening disk, and with the supporting seat for the drag bar on said support, and the wedge-shaped collar or cap on the end of said trunnion also having a seat for the drag bar, the whole device is adapted to be rigidly connected together with a single connecting bolt which passes through said trunnion.

To provide for lubricating the trunnion on which the disk revolves, I form in the top of the support $a$, opposite said trunnion, a chamber $a^{15}$, which leads to a laterally-extending conduit $a^{16}$, which ends on the periphery of the trunnion $a'$. A hinged cover $a^{17}$ is provided for the chamber $a^{15}$. Oil or other lubricant placed in the chamber $a^{15}$ finds a passage through the conduit $a^{16}$ and thence to the periphery of the trunnion $a'$, which being formed conical, as shown, distributes the lubricant evenly on the surface thereof.

Having thus described my invention, I claim—

1. A furrow opener consisting of a support formed integral with an angularly-arranged conduit in a substantially vertical plane, and an angularly-arranged trunnion in a substantially horizontal plane, a concave disk with its outer or convex side adjacent to said conduit, and a drag bar connected to said support by a single fastening bolt which extends through said support and said trunnion, substantially as specified.

2. The combination of a concave disk, of a support therefor having a conical angularly-arranged trunnion extending laterally from said support, and an angularly-arranged conduit adjacent to the back of said disk, a cap for said trunnion having lateral projections, a bifurcated drag bar, one fork of which is adapted to fit between said projections on said cap, and the other fork being extended between projections on the main body of said support, and a fastening bolt extending through the forked extremities of said drag bar and said trunnion, substantially as specified.

3. The combination with a single concave disk journaled on an angularly-arranged trunnion, as described, and a conduit in a plane substantially at right angles to said trunnion, a conductor tube extending into said conduit, a spring catch on said conductor tube, and a projection on said tube with which said spring catch is adapted to engage, substantially as specified.

4. In a furrow opener, a support formed integral with a bearing seat for a drag bar, a laterally-extending trunnion, an angularly-arranged conduit, bearing hubs for a covering device, and projecting lugs to furnish an attachment for a lifting device, substantially as specified.

5. In a furrow opener, a support having a laterally-projecting trunnion and a vertically-arranged conduit, a lubricating chamber formed in the top of said support and having a laterally-extending passage leading therefrom and ending on the periphery of said trunnion, substantially as specified.

6. The combination with a concave disk, of a support having an integrally-formed laterally-extending trunnion on one side thereof, a conduit also formed integrally with said support, said support being also provided with a bearing seat having laterally projecting flanges, and a drag bar arranged in said seat, a cap for said trunnion, and a bolt extending through said drag bar, trunnion and cap and holding the parts rigidly together, substantially as specified.

7. The combination with the support and a concave disk journaled at one side thereof, of a laterally-extending trunnion, as described, an angularly-arranged conduit adjacent to the back of said disk, perforated hubs or trunnions in the rear of said conduit, a pivoted frame on said trunnions, and a covering wheel in said frame, said covering wheel being offset in said frame so as to follow in line with said disk, substantially as specified.

In testimony whereof I have hereunto set my hand this 21st day of July, A. D. 1894.

FRANK R. PACKHAM.

Witnesses:
    FRANK W. GEIGER,
    CHAS. I. WELCH.